United States Patent Office 2,890,226
Patented June 9, 1959

2,890,226

METHOD OF MAKING 4,22 STIGMASTADIEN-3-ONE

Arthur R. Hanze, Kalamazoo Township, Kalamazoo County, Mich., assignor to The Upjohn Company, Kalamazoo, Mich., a corporation of Michigan No Drawing. Application July 14, 1953
Serial No. 367,983

3 Claims. (Cl. 260—397.2)

The present invention relates to a novel process of oxidation of 3-hydroxy-$\Delta^5$-steroid compounds to 3-keto-$\Delta^4$-steroids and is especially concerned with the selective oxidation of stigmasterol to yield 4,22-stigmastadien-3-one.

The novel process of the present invention comprises the selective oxidation of 3-hydroxy-$\Delta^5$-steroid compounds to 3-keto-$\Delta^4$-steroid compounds, especially the selective oxidation stigmasterol to 4,22-stigmastadien-3-one with manganese dioxide.

It is an object of the present invention to provide a novel and economic process for the production of 4,22-stigmastadien-3-one. An additional object is to provide a novel process for the selective oxidation in good yield of 3-hydroxy-$\Delta^5$-steroids, many of which are known in the art, to 3-keto-$\Delta^4$-steroids without concomitant rupture of double bonds. Other objects of this invention will be apparent to one skilled in the art to which this invention pertains.

The prior art shows conversion of stigmasterol to 4,22-stigmastadien-3-one, which is an intermediate in the large scale production of 11-oxygenated steroids, such as cortisone and Kendall's compound F, from soya bean sterols, by several routes. For example, Fernholz and Stavely, J. Am. Chem. Soc., 61, 2956 (1939) show the conversion of stigmasterol to 4,22-stigmastadiene by a six-step process which consists in converting (1) stigmasterol with acetic anhydride to stigmasteryl acetate, (2) stigmasteryl acetate with bromine to 3-acetoxy-5,6,22,23-tetrabromostigmastane, (3) the tetrabromide with sodium iodide to 3-acetoxy-22,23-dibromo-5-stigmastene, (4) the dibromide with alkali hydroxide to 3-hydroxy-22,23-dibromo-5-stigmastene, (5) the 3-hydroxy steroid by Oppenauer oxidation with aluminum tertiary butylate in acetone to 22,23-dibromo-5-stigmastene-3-one and (6) the dibromo-3-keto steroid with zinc and acetic acid to 4,22-stigmastadien-3-one. An improvement on this procedure was recently made by Pederson and Ott, wherein 3-hydroxy-5,6,22,23-tetrabromostigmastane was oxidized with chromic acid to give 5,6,22,23-tetrabromostigmastan-3-one which by treatment with zinc and acetic acid yield 4,22-stigmastadien-3-one, thereby avoiding the inconveniences of an Oppenauer oxidation. The present process, oxidation of stigmasterol to 4,22-stigmastadien-3-one, is still more convenient, since the operation is carried out in one step, with an inexpensive oxidizing agent, which moreover can be recovered and reconverted into its most active form, and with an inexpensive solvent in contrast to the relatively expensive cyclohexanone used in the Oppenauer oxidation. The solvent can be of the non-Oppenauer oxidation. The solvent can be of the non-inflammable type, for example, carbon tetrachloride instead of the highly inflammable ketones necessary in an Oppenauer reduction.

The process can also be used to produce other important steroids such as progesterone by oxidation of pregnenolone, testosterone by selective oxidation of 5-androstene-3$\alpha$,17$\beta$-diol or 5-androstene-3$\beta$,17$\beta$-diol, cholestenone from cholesterol, or other 3-keto-$\Delta^4$-steroids by oxidation of 3-hydroxy-$\Delta^5$-steroids.

In carrying out the process of the present invention, a 3-hydroxy-$\Delta^5$-steroid is dissolved in an organic solvent such as, for example, carbon tetrachloride, chloroform, methylene dichloride, acetone, mixture of hexanes (Skellysolve B), ether, methanol or ethanol, with chlorinated hydrocarbons, such as carbon tetrachloride, chloroform and methylene dichloride preferred, and admixed with manganese dioxide. The mixture is stirred over a period of eight to 96 hours depending on the temperature employed. The ratio of $MnO_2$ to starting steroid is not critical. Amounts from equimolar to large excesses may be used, with an excess of $MnO_2$ being preferred. The temperature range which is operative is between about zero and about 100 degrees centigrade, with a range between about twenty and about eighty degrees centigrade preferred. If the reaction is allowed to proceed at room temperature, i.e., between about twenty and about thirty degrees centigrade, a stirring period of 24 to sixty hours is indicated, while at higher temperatures the reaction period is decreased. The manganese dioxide used in the process may be either a commercial grade or preferably active manganese dioxide freshly prepared, for example, by the method of Attenburrow et al. [J. Chem. Soc. 1094 (1952)] which consists in precipitating manganese dioxide from a solution containing the divalent manganese ion by the addition of potassium permanganate and an alkali hydroxide, and washing and drying the thus-obtained active manganese dioxide. The product, a 3-keto-$\Delta^4$-steroid, is obtained from the reaction mixture by conventional procedures, such as centrifugation, filtration, extraction, recrystallization and chromatography.

The following examples illustrate the process and product of the present invention but are not to be construed as limiting.

EXAMPLE 1

Oxidation of stigmasterol

Five hundred milligrams (500 milligrams) of stigmasterol, dissolved in 2.5 milliliters of carbon tetrachloride, were admixed with five grams of manganese dioxide, freshly prepared by the method of Attenburrow et al. [J. Chem. Soc. 1094 (1952)] and dried at 112 degrees centigrade. The mixture was stirred and refluxed during a period of eight hours and then stirred during a period of twelve hours at room temperature (about 22 to about 25 degrees centigrade). The mixture was then centrifuged, the supernatant liquid was concentrated to a syrup, which was taken up in ethyl acetate. This mixture was centrifuged again and the supernatant liquid concentrated to dryness. Chromatography of the resulting syrup on Florisil gave a fraction which contains a mixture of 50 percent $\Delta^{4,22}$-stigmastadien-3-one and 50 percent $\Delta^{4,6,22}$-stigmastatrien-3-one. The products were identified by ultraviolet and infrared spectra analysis.

EXAMPLE 2

Oxidation of stigmasterol

Two hundred milligrams of stigmasterol, dissolved in ten milliliters of Skellysolve A (mixture of pentane hydrocarbons), was admixed with one gram of active manganese dioxide, prepared by the method indicated in Example 1. The mixture was stirred at room temperature, i.e., at about twenty to 25 degrees centigrade, for a period of sixteen hours, whereafter 0.5 gram of manganese dioxide was added. After stirring for nine hours, another portion of 0.5 gram of manganese dioxide was added and stirring continued for 17 hours.

The mixture was then centrifuged, the supernatant liquid was concentrated to a syrup, redissolved in ethyl acetate, and centrifuged. Concentration of the centrifugate gave material containing 19 percent $\Delta^{4,22}$-stigmastatrien-3-one and 6 percent $\Delta^{4,6,22}$-stagmastatrien-3-one. Extraction of the manganese dioxide with a solution of alcohol and pyridine gave a product containing 24 percent $\Delta^{4,22}$-stigmastadien-3-one and three percent $\Delta^{4,6,22}$-stigmastatrien-3-one.

EXAMPLE 3
Oxidation of pregnenolone

In the same manner as given in Example 1, pregnenolone (3β-hydroxy-5-pregnene-20-one) is oxidized with manganese dioxide in chloroform to give progesterone.

EXAMPLE 4
Oxidation of cholesterol

In the same manner as given in Example 2, cholesterol (3β-hydroxy-5-cholestene) is oxidized with manganese dioxide in methylene dichloride to give 4-cholesten-3-one and 4,6-cholestadien-3-one.

EXAMPLE 5
Oxidation of 5-androstene-3α,17β-diol

In the same manner as given in Example 1, 5-androstene-3α,17β-diol was oxidized with manganese dioxide in carbon tetrachloride to give testosterone.

EXAMPLE 6
Oxidation of 5-androstene-3β,17β-diol

In the same manner as given in Example 2, 5-androstene-3β,17β-diol was oxidized with manganese dioxide in carbon tetrachloride to give testosterone.

Other 3-hydroxy-$\Delta^5$-ketosteroids, such as 5-androstene-3,16,17-triol, 3β-hydroxy-5-cholestene-7-one, ergosterol, 22-dihydroergosterol, 3β,17β-dihydroxy-5-pregnene-20-one, dehydroepiandrosterone, brassicasterol, and the like, may be oxidized to the respective 3-keto-$\Delta^4$-steroids in a manner similar to Examples 1 and 6, using manganese dioxide in organic solvents such as carbon tetrachloride, chloroform, methylene dichloride, acetone, ether, methanol, ethanol, pentane and hexane mixtures and other like solvents at temperatures between about zero and 100 degrees centigrade.

It is to be understood that the invention is not to be limited to the exact details of the procedure shown and described as obvious modifications and equivalents will be apparent to one skilled in the art, and the invention is therefore to be limited only by the scope of the appended claims.

I claim:

1. A process for the production of 4,22-stigmastadien-3-one which comprises: mixing manganese dioxide with a solution of stigmasterol at a temperature between zero and 100 degrees centigrade and recovering the thus-produced 4,22-stigmastadien-3-one.

2. A process for the production of 4,22-stigmastadien-3-one which comprises: mixing freshly prepared manganese dioxide with a solution of stigmasterol at a temperature between zero and 100 degrees centigrade and recovering the thus-produced 4,22-stigmastadien-3-one.

3. A process for the production of 4,22-stigmastadien-3-one which comprises: mixing freshly prepared manganese dioxide with stigmasterol, dissolved in a chlorinated hydrocarbon, at a temperature between twenty and eighty degrees centigrade and recovering the thus-produced 4,22-stigmastadien-3-one.

References Cited in the file of this patent

UNITED STATES PATENTS 2,379,832   Serini _____ July 3, 1945

FOREIGN PATENTS 812,041   France _____ 1937